No. 613,435. Patented Nov. 1, 1898.
W. H. WRIGHT, Jr.
GAME APPARATUS.
(Application filed Jan. 7, 1898.)
(No Model.)
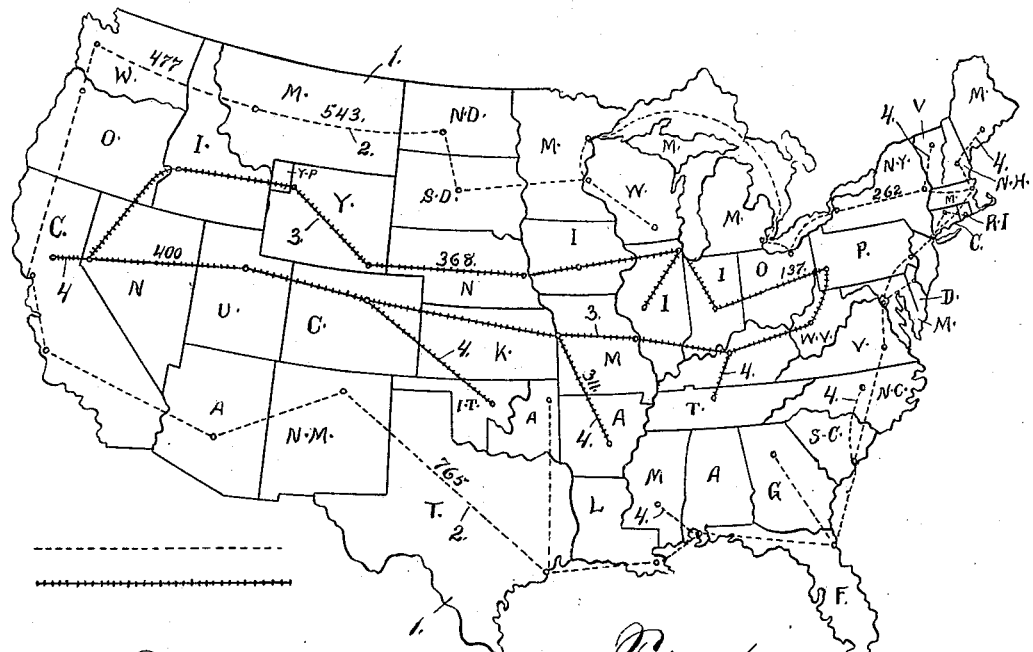
Fig. 1.
Fig. 2.
Fig. 3.
| QUESTIONS, | NEW-YORK. | ANSWERS. | |
|---|---|---|---|
| 1 | What city is the Capital of N.Y. | 1 | Albany |
| 2 | What is the motto of N.Y. | 2 | Excelsior |
| 3 | When was N.Y. admitted as a State | 3 | July 26th 1788. |
| 4 | &c | 4 | &c |
| 5 | | 5 | |
| 6 | | 6 | |
| 7 | | 7 | |
| 8 | | 8 | |
Fig. 4.
Witnesses:
W F Schiff
C B Butler
Inventor.
William H. Wright Jr
By W T Miller
Attorney.
THE NORRIS PETERS CO., PHOTO-LITHO., WASHINGTON, D. C.

UNITED STATES PATENT OFFICE.

WILLIAM H. WRIGHT, JR., OF BUFFALO, NEW YORK.

GAME APPARATUS.

SPECIFICATION forming part of Letters Patent No. 613,435, dated November 1, 1898.

Application filed January 7, 1898. Serial No. 665,895. (No model.)

*To all whom it may concern:*

Be it known that I, WILLIAM H. WRIGHT, Jr., a citizen of the United States, residing at Buffalo, in the county of Erie and State of New York, have invented certain new and useful Improvements in Game Apparatus; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in game apparatus, and more particularly to that class which involves a map and a route or routes laid out upon such map and along which the players progress.

The object of my invention is to add variety to as well as increase the instructiveness of this class of games; and to that end my invention consists of a game apparatus comprising an endless trunk route or routes provided at intervals with branch lines, all arranged upon a geographical map and so constructed as to intersect and lead to, on the line of travel, certain existing cities or capitals, members to be moved along the endless route or routes between stations indicated thereon and along the branch lines, chance-indicating members provided with symbols corresponding to symbols upon the endless route or routes or branch lines, and an individual card or page having on its face a set of historical or other pertinent questions for each city or capital, one or more of which the player must answer correctly on reaching a certain city or capital in order to make further progress beyond said point, a forfeit being exacted in case of failure.

I will now describe the manner in which I have carried out my invention and then claim what I believe to be novel.

In the drawings, Figure 1 is the map with routes marked thereon. Fig. 2 is the moving member. Fig. 3 is the chance-indicating member, and Fig. 4 is the form of questions and answers.

Referring to the drawings, 1 is the map, mounted on stiff cardboard and in hinged sections. It may be of any of the principal countries of the world, the map herein shown being preferably that of the United States. Upon this map are laid out two endless routes 2 and 3. The route 2 (indicated on the map by broken lines) is distinguished as the "outer" or "coast" route, and the route 3 (indicated on the map by a full crossed line) is distinguished as the "inner" or "inland" route. These lines are divided into equal spaces by bars or in any other suitable manner, forming stations to guide and regulate the moves during the trip over the route. These route-lines intersect on the line of travel certain cities or capitals within the states through which they pass, and the cities in the adjoining states outside the line of travel are reached by the branch lines 4. In Fig. 2 is shown the moving member 5, one being provided for each player.

The chance-indicating member is shown in Fig. 3, and consists of a small card, on which is marked a number, as "5," which forms what I designate a "mileage-ticket." There are a series of these tickets for use in playing the game.

Fig. 4 shows a preferred form of questions and their answers relating to New York State and its cities through which the coast-line route passes. There are to be a series of these sets of questions either arranged on separate cards or in pamphlet form and pertinent to the different localities on the line of travel.

The game is played on the mounted map of the United States, following either of the two routes laid out and distinguished as the "coast-line" trip and the "inland" trip, thus making a longer or shorter game, and both covering the principal cities and points of interest in our country.

From three to six can conveniently play at one time, one of the party (not a player) being chosen professor for the purpose of asking questions, as defined below.

The starting and finishing point on either route is the city nearest to place where players are located. The first player will begin by selecting one of the mileage-tickets, which are first placed face down in game-box. The number of bars one can move is determined by the figures on mileage-tickets. To enter the moving figure on starting-point, each player must draw a mileage-ticket marked "10," when entry can be made on "5" and the figure be moved five bars, the direction taken being indicated on the route line. If the move carry the player to or through a city, the professor will ask of this one some question pertaining to this particular city or locality. If answered correctly, the player is entitled to move ahead one bar as a reward. In case of failure to answer the player must move back one bar. Other players proceed in like manner.

Should a player draw a mileage-ticket entitling him to pass through two or more cities, one question must be asked for each city, the player to move one bar ahead for each correct answer or to be set back one bar for each incorrect answer.

The cities are safety-points, and a player cannot be sent back by a player moving to same bar. Should a player be on an intermediate bar, however, and a competing player move to same bar the former is to be sent back two cities.

The branch lines 4 serve to take in the cities and States not included in the trunk routes shown and add an interesting feature to the game. For example, as the player is proceeding along the route, moving from one station to the next, as indicated by the numbers on the mileage-tickets, the branch lines are ignored if his ticket carries him beyond the city from which the branch line starts. Should his mileage-ticket, however, land him in the city in question, he must then travel to the terminus of the branch and back again to the trunk route before further progress thereon. This branch-line feature may be omitted if it is desired to shorten the game.

The game is won by the player who succeeds in going over the route and reaching home first.

The distance between stations is approximately fifty miles, the actual (air-line) distance between cities being represented by the figures shown midway between cities.

"A Tour of Our Country" is a game of instruction as well as amusement. Played, as it is, upon an outline map of the United States, it familiarizes the player with the relative positions, sizes, &c., of the various States, and the distances between cities can soon be memorized. The questions applied will serve to improve one's knowledge of his own country.

I claim—

1. In a game apparatus an endless trunk route or routes arranged upon a geographical map, and so constructed as to intersect, on the line of travel, certain existing cities and capitals, members to be moved along the endless route or routes between stations indicated thereon, chance-indicating members provided with symbols corresponding to symbols upon the endless route or routes, and an individual card or page having on its face a set of historical or other pertinent questions for each city or capital, one or more of which the player must answer correctly on reaching a certain city or capital.

2. In a game apparatus an endless trunk route or routes provided at intervals with branch lines, all arranged upon a geographical map and so constructed as to intersect and lead to, on the line of travel, certain existing cities or capitals, members to be moved along the endless route or routes between stations indicated thereon, and along the branch lines, chance-indicating members provided with symbols corresponding to symbols upon the endless route or routes, and an individual card or page having on its face a set of historical or other pertinent questions for each city or capital.

In testimony whereof I have signed my name to this specification in the presence of two subscribing witnesses.

WILLIAM H. WRIGHT, JR.

Witnesses:
ANNA M. WRIGHT,
W. T. MILLER.